United States Patent Office 3,394,020
Patented July 23, 1968

3,394,020
STABILIZATION OF ORGANIC MATERIALS
WITH ALKYLATED PHENOLS
Alan Bell and Gerald Ray Lappin, both of P.O. Box 511,
Kingsport, Tenn. 37662
No Drawing. Continuation-in-part of application Ser. No.
362,197, Apr. 23, 1964. This application Sept. 14, 1967,
Ser. No. 667,649
10 Claims. (Cl. 106—270)

ABSTRACT OF THE DISCLOSURE

Stabilization of oxidizable organic materials with substances of the structure

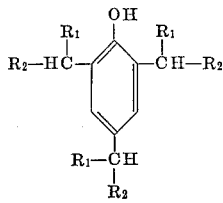

wherein $R_1=H$ or $CH_3$, $C_2H_5$ or $C_3H_7$ straight-chain alkyls, $R_2=C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$ and $C_{18}H_{37}$ and $R_1+R_2$ total 9 to 19 carbon atoms.

---

This is a continuation-in-part of Ser. No. 362,197, filed Apr. 23, 1964, now U.S. Patent No. 3,347,938.

This invention relates to antioxidants and more particularly to a new class of compounds having structure and properties which render them especially useful as antioxidants for various polyolefins, e.g., oxidizable organic materials such as polyethylene, polypropylene and polybutene and copolymers thereof, paraffin wax and the like. More especially the invention relates to a special class of 2,4,6-trialkylated phenols in which at least two of the alkyl groups contain long branched chains.

The use of 2,6-alkylated phenols such as 2,6-di-t-butyl-p-cresol as antioxidants for polymers and other oxidizable organic materials is known. These can be represented by the following structure:

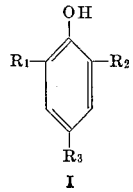

Past experience has shown that $R_1$ and, often, $R_2$ must be lower tertiary alkyl groups to make Structure I a potent antioxidant. On the other hand, it has been generally agreed that $R_3$ must be either methyl or hydrogen or the potency is greatly decreased. For example, although 2,6-di-t-butyl-p-cresol ($R_1=R_2=$t-butyl, $R_3=CH_3$) and 2,6-di-t-butylphenol ($R_1=R_2=$t-butyl, $R_3=H$) are quite effective antioxidants, 2,4,6-tri-t-butylphenol ($R_1=R_2=R_3=$t-butyl) is almost completely ineffective. Thus it would be totally unexpected that compounds such as Structure II (below) without short-chain alkyls in the 2 and 6 positions would be effective antioxidants. From all past experience such a compound would be expected to be relatively inactive as an antioxidant.

We have now made the surprising discovery that compounds having Structure II wherein at least two of the 2,4,6 substituents are long secondary alkyl groups are unexpectedly potent antioxidants in a wide variety of oxidizable organic substances. Such compounds are represented by the structural formula:

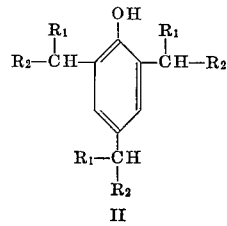

wherein $R_1=H$ or $CH_3$, $C_2H_5$, $C_3H_7$ straight chain alkyl groups, $R_2=C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$ straight chain alkyl groups, and $R_1+R_2$ total 9 to 19 carbon atoms. Furthermore, we have made the equally surprising discovery that analogs of Structure II in which the substituent alkyl groups are tertiary such as Compound III are almost completely ineffective as antioxidants:

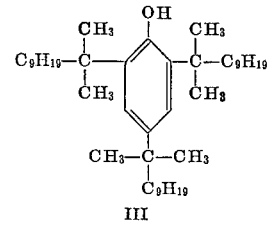

It is accordingly the principal object of the present invention to provide a new class of antioxidants having structures and properties which render them especially useful as antioxidants for various polyolefins such as polyethylene, polypropylene and polybutylene, paraffin wax and various other oxidizable organic materials.

Another object is to provide a new class of alkylated phenols useful as antioxidants for the materials referred to in the preceding paragraph.

A specific object is to provide a new class of highly effective antioxidant 2,4,6-trialkylated phenols in which at least two of the alkyl groups contain long chains which are saturated secondary alkyl groups.

Other objects will appear hereinafter.

These objects are accomplished by the invention described herein and illustrated by the examples that follow. In its broad aspects and as set forth above, the invention based upon the discovery that when at least two of the three substituent groups of 2,4,6-trialkyl phenols are long secondary alkyl groups these alkylated phenols have remarkable antioxidant potency when employed in polymeric substances such as polyethylene, polypropylene, polybutylene, paraffin waxes and other oxidizable organic materials which are subject to oxidative decomposition and degradation especially under thermal influences. As indicated previously, our new antioxidants are 2,4,6-trialkylated phenols which may be represented by the structural formula:

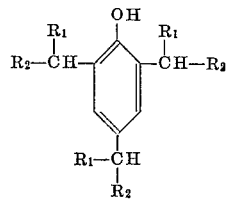

wherein $R_1=H$ or $CH_3$, $C_2H_5$, $C_3H_7$ straight chain alkyl groups and $R_2=C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$, $C_{18}H_{37}$ straight chain alkyl groups and $R_1+R_2$ total 9 to 19 carbon atoms.

The amount of our 2,4,6-trialkylated phenol antioxidant which can best be used according to our invention is 0.1% to 5% by weight of the oxidizable organic material with 0.1 to 0.5% by weight being preferred.

The antioxidants herein described may include mixtures of isomeric compounds differing in the configuration about the α-carbon atom of the substituent alkyl groups. Present analytical techniques are incapable of separating such isomers or demonstrating unequivocally their presence or absence in our new antioxidants.

In the following examples and descriptions we have set forth several of the preferred embodiments of our new antioxidants but they are included merely for purposes of illustration and not as a limitation thereof.

EXAMPLE I

Preparation of 2,4,6-tris(1-methylheptadecyl)phenol

Boron trifluoride gas was passed into 94 g. (1.0 mole) of phenol until 12 g. has been absorbed. The mixture was then heated to 85° C. and to it was added over 45 minutes 762 g. (3.0 moles) of 1-octadecene. The temperature was held at 82°–85° C. by heating as required. Heating at this temperature was continued for an additional 2 hours. The mixture was then cooled and dissolved in 1 l. of hexane. The hexane solution was washed once with 1 l. of water, twice with 5 percent aqueous sodium acetate and twice more with water. The hexane was evaporated and the residue stripped under vacuum to a base temperature of 260° C. at 1 mm. pressure. The residue was molecularly distilled in a falling film still to give 710 g. of amber moderately viscous oil, distilling at 217–220 at 1 micron pressure which has a molecular weight of 830 and was identified as 2,4,6-tris(1-methylheptadecyl)phenyl ($C_{60}H_{114}O$, calculated molecular weight 856).

EXAMPLE II

Preparation of 2,4,6-tris(1-methylnonadecyl)phenol

Following the method of Example I, 94 g. (1.0 mole) of phenol was alkylated with 840 g. (3.0 moles) of 1-eicosene. After isolation as in Example I molecular distillation gave 850 g. of viscous amber oil distilling at 235–250° C. at 1 micron and having a molecular weight of 895. The molecular weight calculated for $C_{66}H_{126}O$ is 934.

EXAMPLE III

Preparation of 2,4,6-tris(1-methylundecyl)phenol

Following the same procedure as in Examples I and II, 94 g. (1.0 mole) of phenol was alkylated with 504 g. (3.0 moles) of 1-dodecene. The product, isolated and purified as before, was an amber viscous oil, B.P. 160°–170° at 2 microns. The molecular weight was found to be 585. The calculated molecular weight for $C_{38}H_{78}O$ is 598.

EXAMPLE IV

Preparation of 2,4,6-tris(1-methylnonly)phenol)

Boron trifluoride gas was passed into 42 g. (0.5 mole) of phenol until 3 g. had been absorbed. The mixture was then stirred and heated to 75° C. 420 g. (2.5 moles) of decene-1 was added dropwise at such a rate as to maintain the reaction temperature between 80–85° C. When the addition of the olefin was finished, the reaction mixture was stirred and heated at 80–85° C. for 2 more hours. The reaction mixture was cooled to room temperature and 200 ml. of hexane were added. The solution was then washed with 5% aqueous sodium acetate until the washes were neutral to litmus paper. The solvent was removed by distillation under vacuum and the excess reactants removed by vacuum stripping to a pot temperature of 200° C. at 1 mm. pressure. The crude product was purified by molecular distillation to give 175 g. of amber oil which has a molecular weight of 500 and was identified at 2,4,6-tris(1-methylnonyl)phenol ($C_{36}H_{66}O$, calculated molecular weight 514).

The above new compounds were tested for antioxidant effectiveness in a number of polymeric substances subject to decomposition or degradation under oxidative influences and were found to be extremely effective. A description of such tests and the results obtained are set forth below.

Antioxidant effectiveness of compounds in polypropylene.—The subject antioxidants were incorporated in polypropylene at the 0.3 percent level by milling in a Banbury mixer. Samples, in the form of approximately ⅛ inch thick strips, were evaluated by the 160° C.-oven test and 140° C. stress-crack test. The 160° C.-oven test is carried out by exposing the samples in an air oven at 160° C. until the first appearance of peroxide as shown by the usual iodiometric test. In the stress-crack test the samples are bent in the shape of a U by inserting in a slotted metal holder and then exposed in an air oven at 140° C. until visual examination shows the presence of surface cracks. The results of these tests are shown in Table 1.

TABLE 1

| Antioxidant | 160° Oven Life (hrs.) | 140° Stress Crack Life (hrs.) |
|---|---|---|
| None | 0.3 | 3 |
| 2,4,6-tris(1-methylnonadecyl) phenol | 6.0 | 22 |
| 2,4,6-tris(1-methylheptadecyl) phenol | 4.0 | 15 |
| 2,4,6-tris(1-methyltridecyl) phenol | 4.0 | 13 |
| 2,4,6-tris(1-methylundecyl) phenol | 2.0 | 10 |
| $C_{16}$-$C_{20}$ trisalkylated phenol [1] | 4.0 | 14 |
| 2,4,6-tri-t-butyl phenol | 0.4 | 3 |
| Propylenetetramer trisalkylated phenol [2] | 0.5 | 4 |
| i-Butylenetrimer trisalkylated phenols [3] | 0.3 | 3 |

[1] Alkylated with Enjay Chemicals Company α-olefin mixture contain about equal quantities of 1-hexadecene, 1-heptadecene, 1-octadecene, 1-nonadecene and 1-eicosene.
[2] See Structure III.
[3] Similar to Structure III, i.e., all alkyl groups are tertiary $C_{12}H_{25}$-branched alkyls.

Another group of the subject antioxidants were incorporated in polypropylene at the 0.3 percent level by milling in a Banbury mixer. Samples, in the form of approximately ¹⁄₁₆ inch thick moldings, were evaluated by the 160° C.-oven test as previously described. The results of these tests are shown in Table 2.

TABLE 2

Antioxidant: 160° C. oven life (hrs.)
  None _____ <1
  2,4,6-tri-t-butyl phenol _____ 1
  2,4,6-tris(1-methylnonyl)phenol _____ 5
  2,4,6-tris(1-methylundecyl)phenol _____ 5
  2,4,6-tris(1-methyltridecyl)phenol ____ 4.5
  2,4,6-tris(1-methylpentadecyl)phenol __ 5
  2,4,6-tris(1-methylheptadecyl)phenol __ 3.5

Antioxidant effectiveness of compounds in polyethylene.—The subject antioxidants were incorporated in polyethylene at the 0.3 percent level by milling as described for polypropylene. Samples, in the form of ⅛ inch thick strips, were evaluated by exposure in an air oven at 160° C. until an increase in peroxide concentration occurred. The results are reported in Table 3.

TABLE 3

Antioxidant: 160° C. oven life (hrs.)
  None _____ 2
  2,4,6-tris(1-methylnonadecyl)phenol ___ 25
  2,4,6-tris(1-methylpentadecyl)phenol __ 20
  2,4,6-tris(1-methylundecyl)phenol ____ 18
  2,4,6-tri-t-butyl phenol _____ 2
  Propylenetetramer trisalkylated phenol [1] _____ 3

[1] See Structure III.

Another group of the subject antioxidants were incorporated in polyethylene at the 0.3 percent level and samples, in the form of ¹⁄₁₆ inch thick moldings, were evaluated by the 160° C. oven test. The results of these tests are shown in Table 4.

TABLE 4

| Antioxidant: | 160° C. oven life (hrs.) |
|---|---|
| None | 5.5 |
| 2,4,6-tri-t-butyl phenol | 6.0 |
| 2,4,6-tris(1-methylnonyl)phenol | >12.0 |
| 2,4,6-tris(1-methylundecyl)phenol | >12.0 |
| 2,4,6-tris(1-methyltridecyl)phenol | >12.0 |
| 2,4,6-tris(1-methylpentadecyl)phenol | >12.0 |
| 2,4,6-tris(1-methylheptadecyl)phenol | >12.0 |

Antioxidant effectiveness of compounds in poly-1-butene.—The subject antioxidants were incorporated in poly-1-butene at the 1.0 percent level by milling. Samples, in the form of ⅛ inch thick strips, were evaluated by the 160° C. oven test as described above. The results are summarized in Table 5.

TABLE 5

| Antioxidant: | 160° C. oven life (hrs.) |
|---|---|
| None | 0.25 |
| 2,4,6-tris(1-methylheptadecyl)phenol | 5 |
| 2,4,6-tris(1-methyltetradecyl)phenol | 5 |
| 2,4,6-tris(1-methylundecyl)phenol | 3 |
| 2,4,6-tris-t-butyl phenol | 0.3 |
| Propylenetetramer trisalkylated phenol [1] | 0.4 |

[1] See Structure III.

Antioxidant effectiveness of compounds in a 1 to 1 copolymer of propylene and 1-butene.—The subject antioxidants were incorporated at the 1.0 percent level and evaluated as previously described using the 160° C. oven test. The results are summarized in Table 6.

TABLE 6

| Antioxidant: | 160° C. oven life (hrs.) |
|---|---|
| None | 0.4 |
| 2,4,6-tris(1-methylheptadecyl)phenol | 7 |
| 2,4,6-tris(1-methylundecyl)phenol | 5 |
| 2,4,6-tri-t-butyl phenol | 0.4 |
| Propylenetetramer trisalkylated phenol [1] | 0.4 |

[1] See Structure III.

Antioxidant effectiveness of compounds in a propylene polymer containing ethylene.—The subject antioxidants were incorporated at the 1.0 percent level and samples, in the form of 5 mil film sections, were evaluated using the 140° C. oven test. The results are summarized in Table 7.

TABLE 7

| Antioxidant: | 140° C. oven life (hrs.) |
|---|---|
| None | <1 |
| 2,4,6-tri-t-butyl phenol | <1 |
| 2,4,6-tris(1-methylnonyl)phenol | 12 |
| 2,4,6-tris(1-methylundecyl)phenol | 12 |
| 2,4,6-tris(1-methyltridecyl)phenol | 12 |
| 2,4,6-tris(1-methylpentadecyl)phenol | 12 |
| 2,4,6-tris(1-methylheptadecyl)phenol | 12 |

Antioxidant effectiveness of compounds in paraffin wax.—The subject antioxidants were incorporated in paraffin wax at the 0.05 percent level by mixing with the molten wax. Air was bubbled through the molten wax at the rate of 2.33 ml./sec. at 150° C. and the time required for the build up in peroxide to 20 milliequivalents per kilogram was reported as the AOM value. The results are tabulated in Table 8.

TABLE 8

| Antioxidant: | AOM value (hrs.) |
|---|---|
| None | 3 |
| 2,4,6-tris(1-methylheptadecyl)phenol | 180 |
| 2,4,6-tris(1-methylundecyl)phenol | 110 |
| 2,4,6-tri-t-butyl phenol | 8 |
| Propylenetetramer trisalkylated phenol [1] | 4 |

[1] See Structure III.

The data presented in the preceding tables show the unexpected superiority of the 2,4,6-trisalkylated phenols wherein at least two of the 2,4,6-substituents are long secondary alkyl groups as antioxidants in various organic materials.

The invention has been described in detail with particular reference to preferred embodiments thereof, but it will be understood that variations and modifications can be effected within the spirit and scope of the invention as described hereinabove and as defined in the appended claims.

We claim:

1. A composition of matter comprising an oxidizable organic material selected from the group consisting of polyethylene, polypropylene, polybutene, copolymers thereof and paraffin wax containing an antioxidant stabilizing amount of a 2,4,6-trialkylated phenol of the structure

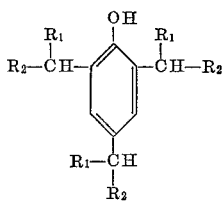

in which $R_1$=H or $CH_3$, $C_2H_5$ or $C_3H_7$ straight-chain alkyls, $R_2$=$C_8H_{17}$, $C_9H_{19}$, $C_{10}H_{21}$, $C_{11}H_{23}$, $C_{12}H_{25}$, $C_{13}H_{27}$, $C_{14}H_{29}$, $C_{15}H_{31}$, $C_{16}H_{33}$, $C_{17}H_{35}$ and $C_{18}H_{37}$, and $R_1+R_2$ total 9 to 19 carbon atoms.

2. The composition of claim 1 wherein the antioxidant stabilizing amount is 0.01 to 5 percent by weight.

3. The composition of claim 1 wherein the antioxidant stabilizing amount is 0.1 to 0.5% by weight.

4. The composition of claim 1 wherein the 2,4,6-trialkylated phenol is 2,4,6-tris(1-methylnonyl) phenol.

5. The composition of claim 1 wherein the 2,4,6-trialkylated phenol is 2,4,6-tris(1-methylheptadecyl) phenol.

6. The composition of claim 1 wherein the 2,4,6-trialkylated phenol is 2,4,6-tris(1-methyltridecyl) phenol.

7. The composition of claim 1 wherein the 2,4,6-trialkylated phenol is 2,4,6-tris(1-methylpentadecyl) phenol.

8. The composition of claim 1 wherein the 2,4,6-trialkylated phenol is 2,4,6-tris(1-methylnonadecyl) phenol.

9. The composition of claim 1 wherein the 2,4,6-trialkylated phenol is 2,4,6-tris(1-methyltetradecyl) phenol.

10. The composition of claim 1 wherein the 2,4,6-trialkylated phenol is 2,4,6-tris(1-methylundecyl) phenol.

References Cited

UNITED STATES PATENTS 2,202,877  6/1940  Stevens et al. _____ 260—624
3,255,255  6/1966  Orloff _____ 260—619

DONALD E. CZAJA, *Primary Examiner.*

H. E. TAYLONR, Jr., *Assistant Examiner.*

UNITED STATES PATENT OFFICE
CERTIFICATE OF CORRECTION

Patent No. 3,394,020                                  July 23, 1968

Alan Bell et al.

It is certified that error appears in the above identified patent and that said Letters Patent are hereby corrected as shown below:

In the heading to the printed specification, lines 4 and 5, "P. O. Box 511, Kingsport, Tenn. 37662" should read -- Kingsport, Tenn., assignors to Eastman Kodak Company, Rochester, N. Y., a corporation of New Jersey --.

Signed and sealed this 6th day of January 1970.

(SEAL)
Attest:

Edward M. Fletcher, Jr.
Attesting Officer

WILLIAM E. SCHUYLER, JR.
Commissioner of Patents